US005796698A

United States Patent [19]

Ookawa et al.

[11] Patent Number: 5,796,698

[45] Date of Patent: Aug. 18, 1998

[54] DISC APPARATUS

[75] Inventors: Eiichi Ookawa, Iwate-ken; Hiroto Nishida, Ishikawa-ken; Takashi Suzuki, Tokyo; Hitoshi Watanabe, Morioka; Toshiaki Sasaki, Chofu, all of Japan

[73] Assignee: Matsushita Electric Industrial Co., Ltd., Osaka, Japan

[21] Appl. No.: 671,591

[22] Filed: Jun. 28, 1996

Related U.S. Application Data

[62] Division of Ser. No. 301,992, Sep. 9, 1994, Pat. No. 5,590, 109.

[30] Foreign Application Priority Data

| | | | |
|---|---|---|---|
| Sep. 17, 1993 | [JP] | Japan | 5-231185 |
| Sep. 17, 1993 | [JP] | Japan | 5-231216 |
| Sep. 17, 1993 | [JP] | Japan | 5-231217 |

[51] Int. Cl.$^6$ .............................. G11B 33/02; G11B 17/04

[52] U.S. Cl. ...................... 369/77.2; 369/75.2; 360/99.06

[58] Field of Search .................................. 369/77.1, 77.2, 369/75.1, 75.2, 258, 270, 271; 360/99.06, 99.02, 99.12

[56] References Cited

U.S. PATENT DOCUMENTS

| | | | |
|---|---|---|---|
| 5,119,358 | 6/1992 | Soga | 369/77.1 |
| 5,132,958 | 7/1992 | Camps et al. | 369/77.2 |
| 5,153,867 | 10/1992 | Inoue | 369/77.2 |
| 5,323,371 | 6/1994 | Nagase et al. | 369/77.2 |

FOREIGN PATENT DOCUMENTS

| | | | |
|---|---|---|---|
| 0145052A3 | 6/1985 | European Pat. Off. . | |
| 0439853A1 | 8/1991 | European Pat. Off. . | |
| 3911714A1 | 10/1989 | Germany . | |
| 4109361A1 | 9/1991 | Germany . | |
| 61-162861 | 7/1986 | Japan | 369/77.1 |

*Primary Examiner*—Allen Cao

*Attorney, Agent, or Firm*—Watson Cole Stevens Davis, P.L.L.C.

[57] ABSTRACT

A loader conveys a holder, carrying thereon a disc cartridge, between a cartridge ejection position and a reproducing/recording position. The loader has an engaging part which engages with a lock mechanism so as to release a holder pin in the lock mechanism from its locked condition in order to hold a movable chassis in a floating condition and to lock the holding pin in the lock mechanism so as to fix the movable chassis to the stationary chassis when the holder comes to the cartridge ejecting side. When the holder is moved to the reproducing/recording position, the holding pin provided on the holder engages with a shutter closing spring so as to retract an engaging part at the front end of the shutter closing spring through an opening in the holder in order to prevent the disc cartridge from making contact with the shutter closing spring, thereby making it possible to give a satisfactory feeling of insertion of the disc cartridge and avoid damaging the disc cartridge.

1 Claim, 12 Drawing Sheets

DISC APPARATUS

This is a division of application Ser. No. 08/301,992 filed Sep. 9, 1994, U.S. Pat. No. 5,590,109.

BACKGROUND OF THE INVENTION

1. Field of the Invention

The present invention relates to a disc apparatus for reproducing and writing data on a data recording disc in a photomagnetic recording type minidisc cartridge.

2. Prior Art

In recent years, disc cartridges in which a data recording disc is housed in a protecting cartridge (which will be hereinbelow denoted simply as a "cartridge") have been proposed. A photomagnetic recording type minidisc cartridge, as one example of this kind of cartridge, is shown in FIG. 11. In FIG. 11, cartridge 100 incorporates a cartridge casing 101, a data recording disc 102 housed in the cartridge casing 101, a disc access hole 106 formed at one side of the cartridge casing 101, and a slide shutter 104 for opening and closing the disc access hole 106. Further, cartridge gripping recesses 105 are formed at the left and right sides on the front side of the rear surface of the cartridge casing 101, and a longitudinal groove 106 is formed in the right end face of the cartridge casing 101 and receives a shutter engaging member (which is not shown) in its intermediate part. This shutter engaging member is urged toward the groove 106 by a spring (which is not shown), that is, it can be retracted. Further, this shutter engaging member is linked to the above-mentioned slide shutter 104.

Further, data is recorded in or reproduced from this cartridge by means of a disc apparatus in which an optical pick-up records or reproduces data while it moves radially of the data recording disc 102 with a predetermined gap between the optical pick-up and the data recording disc 102, and accordingly, it is necessary to eliminate vibrations transmitted from the outside. To this end, a movable chassis (suspension chassis) for holding the optical pick-up is supported in a floating condition on a stationary chassis by means of resilient members. Further, this movable chassis is normally fixed to the stationary chassis by means of a lock mechanism which does not belong to a loading mechanism, except that the disc cartridge is set at a position other than a recording/reproducing position.

Further, in this disc apparatus, as shown in FIGS. 12 and 13*a–c*, a holder 110 for loading and ejecting the cartridge 100 is provided with a shutter closing spring 112, as shown in FIG. 12, having an engaging part 111 which is adapted to be engaged in a shutter opening and closing hole 108 formed in the slide-shutter 104 so as to close the slide-shutter 104 upon ejection of the disc cartridge 100.

Further, in this disc apparatus, as shown in FIGS. 13*a* to 13*c*, a loader shift mechanism has a rack member 120 on which a loader 109 is mounted, and a gear 122 meshed with a rack tooth part 121 of the rack member 120 and coupled to a pinion of a drive motor through the intermediary of a drive gear train. Further, when the gear 122 is rotated through the drive gear train, the rack member 120, which is meshed with the gear 122 through the rack tooth part 121 thereof, is moved, and accordingly the loader 109 is shifted.

SUMMARY OF THE INVENTION

However, the above-mentioned conventional disc apparatus has a disadvantage, as a first problem, in which the lock mechanism is not moved while being directly coupled with the loading mechanism, and accordingly, the timing of the operation of the lock mechanism becomes out of phase so that movable chassis cannot be precisely positioned.

Thus, the present invention is devised in view of the first problem, and accordingly, a first object of the present is to provide a disc apparatus in which the lock mechanism can be moved while being directly coupled with the loading mechanism so that the timing of the operation of the lock mechanism is prevented from being out of phase, thereby making it possible to precisely position the movable chassis.

In order to achieve the above-mentioned object, according to the present invention, there is provided a disc apparatus comprising a holder pin provided on a movable chassis which is supported on a stationary chassis through the intermediary of resilient members and on which a turntable and an optical pick-up are mounted, a mechanical lock mechanism provided on the stationary chassis and adapted to releasably grip the above-mentioned holder pin, for fixing the movable chassis to the stationary chassis, a holder movably provided on the movable chassis, for holding a disc cartridge therein so as to load and eject the disc cartridge, a loader provided on the stationary chassis, for conveying the holder in a predetermined conveying direction, and pin actuating means adapted to interfere with the mechanical lock mechanism at an end of loading operation of the disc cartridge, for causing the mechanical lock mechanism to release the holder pin, and adapted to interfere with the mechanical lock mechanism at a start of ejecting operation of the disc cartridge, for causing the mechanical lock mechanism to lock the holder pin.

With this arrangement, the pin actuating means incorporated in the loader interferes with the mechanical lock mechanism at an end of the loading operation so as to cause the mechanical lock mechanism to release the holder pin from the locking condition, and further, the pin actuating means interferes with the mechanical lock mechanism at a start of the ejecting operation of the disc cartridge so as to cause the mechanical lock mechanism to lock the holder pin. Accordingly, the mechanical lock mechanism can be moved while being directly coupled with the loading mechanism, and therefore, the movable chassis can be precisely positioned without the timing of operation of the mechanism lock mechanism becoming out of phase.

Further, since the above-mentioned conventional disc apparatus has another disadvantage, as a second problem, in which the engaging part 111 at the front end of the shutter closing spring 112 is always projected in a cartridge insertion part 113 when the holder 110 is located at a forward position (on the cartridge 100 insertion side), and accordingly, the engaging part 111 of the shutter closing spring 112 abuts against the disc cartridge 100 inserted into the cartridge insertion part 113. As a result, a problem of disagreeable feeling of insertion of the disc cartridge 100 and scratching on the disc cartridge 100 have occurred.

The present invention is devised in view of this second problem, and accordingly, a second object of the present invention is to provide a disc apparatus which can give satisfactory feeling of insertion of the disc cartridge and which can avoid scratching on the cartridge due to contact between the disc cartridge and the engaging part of the shutter closing spring.

In order to achieve the above-mentioned second object, according to the present invention, there is provided a disc apparatus comprising a holder for receiving therein and for conveying a disc cartridge housing a data recording disc and incorporating a slide shutter, in a predetermined conveying direction, a shutter opener provided so as to be reciprocatable in the conveying direction, relative to the holder, along one side of the holder, the holder and the shutter opener defining a cartridge insertion part, a shutter closing spring having at its front end an engaging part and secured to the shutter opener, an opening formed at a surface of the shutter opener on the cartridge insertion part side, for allowing the engaging part of the shutter closing spring to project into the cartridge insertion part, and an escape mechanism provided in the holder, for retracting the engaging part of the shutter closing spring from the cartridge insertion part through the opening when the holder is positioned on the cartridge insertion side.

Further, according to one specific form of the present invention, the escape mechanism includes a holding pin holding the shutter opener and adapted to interfere with the shutter closing spring when the holder is positioned on the cartridge insertion side, for retracting the engaging part of the shutter closing spring from the cartridge insertion part through the opening.

With this arrangement, when the holder is positioned on the cartridge insertion side, the engaging part at the front end of the shutter closing spring is retracted from the cartridge insertion part through the opening by means of the escape mechanism. Further, when the holder moves in the cartridge conveying direction, the escape mechanism becomes inoperative so that the engaging part of the shutter closing spring projects into the cartridge insertion part through the opening.

Thus, since the engaging part of the shutter closing spring is retracted from the cartridge insertion part through the opening when the holder is positioned on the cartridge insertion side, the engaging part of the shutter closing spring is prevented from abutting against a disc cartridge inserted into the cartridge insertion part, and accordingly, it is possible to give a satisfactory feeling of insertion, and further, to avoid scratching of the disc cartridge due to contact between the disc cartridge and the engaging part of the shutter closing spring.

Next, the above-mentioned conventional disc apparatus has another disadvantage, as a third problem, in which a space having a long length D as shown in FIG. 13*c* is required in order to shift the loader 109 by a distance L since the rack member 120 is a single integral component.

Further, an external force exerted to the rack member 109 or the loader 120, is inevitably transmitted to the gear 122 through the drive gear train, and accordingly, there has been a problem of occurrence of damage to the gear 122 or the like.

The present invention is also devised in view of the above-mentioned third problem, and accordingly, a third object of the present invention is to provide a disc apparatus which can decrease the space required for shifting the loader, and can also prevent gears in the drive part from being damaged.

In order to achieve the third object, according to the present invention, there is provided a disc apparatus comprising a stationary chassis, a first and a second rack member having a tooth part and provided on the stationary chassis so as to be movable in a shifting direction of a loader, a guide pin provided on the first rack member, a guide hole formed in the second rack member, the guide pin being inserted through the guide hole and coupled at its front end to the loader, spring retaining parts formed respectively on the first and second rack members, and a spring bridging between the spring retaining parts, a gear meshed with the tooth part of the second rack member, and a drive gear train engaged with the gear.

With this arrangement, when the gear is rotated by means of the gear train, the second rack member having the tooth part meshed with the gear is moved in one of the shifting directions of the loader, the guide pin is pushed by one end part of the guide hole formed in the second rack member so that the loader moved in the one of the loader shifting directions. In this case, the first rack member is moved in the one of the loader shifting direction in association with the shifting of the loader.

Further, when the gear comes to one end of the tooth part of the second rack member, the gear is then meshed with the tooth part of the first rack member. Further, when the gear leaves off the tooth part of the second rack member so that it is mentioned with only the tooth part of the first rack member, the first rack member is moved in one of the loader shifting directions. As a result, the loader is moved in one of the loader shifting directions by means of the guide pin.

Thus, when the gear is rotated, the second rack member is fed so as to shift the loader, and thereafter, only the first rack member is fed so as to move the loader without the second rack member being fed, and accordingly, a necessary space for feeding the loader can be made to be small in comparison with that of the conventional arrangement in which the loader is shifted by a single integral rack member.

Further, since the first and second rack members are coupled together by the spring, if an external force is exerted to the first rack member or the loader in a condition in which the gear is meshed with the second rack member, the first rack member is moved, only causing an extension of the spring, and accordingly, the external force can be prevented from being transmitted to the drive gear train through the gear, thereby making it possible to avoid damaging the gears or the like.

BRIEF DESCRIPTION OF THE INVENTION

Figure 4A:
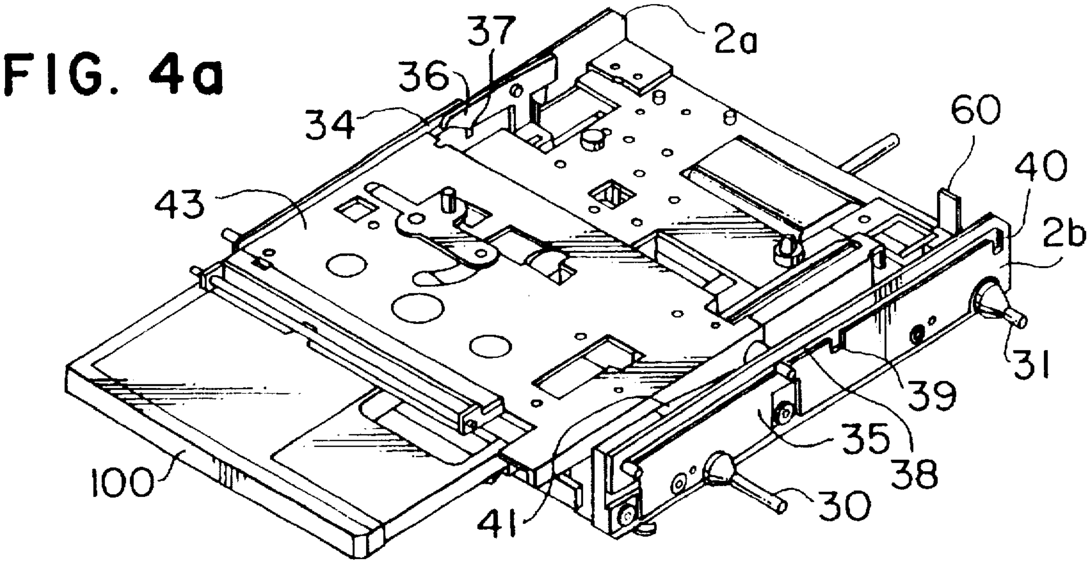
Figure 4B:
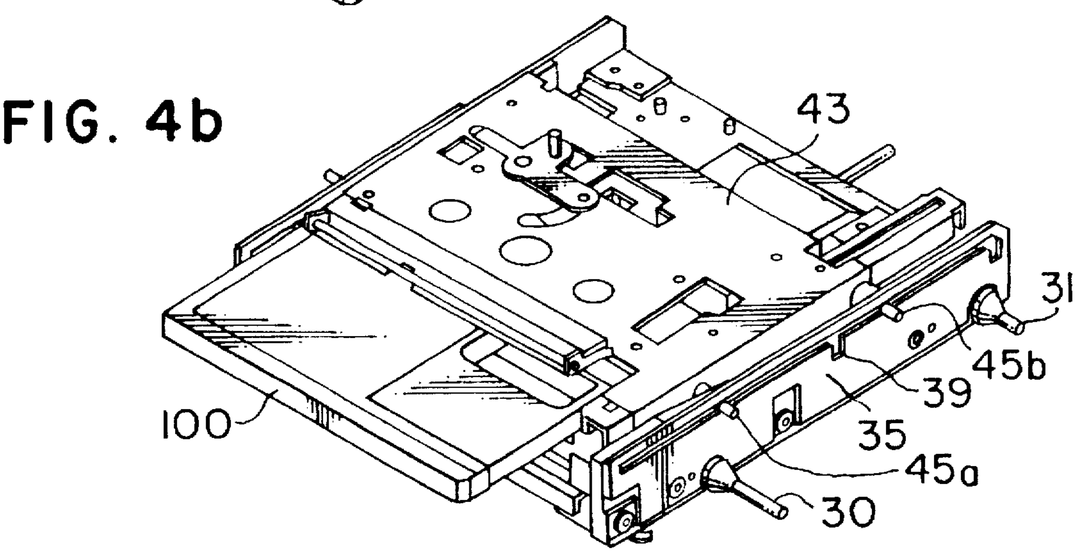
Figure 4C:
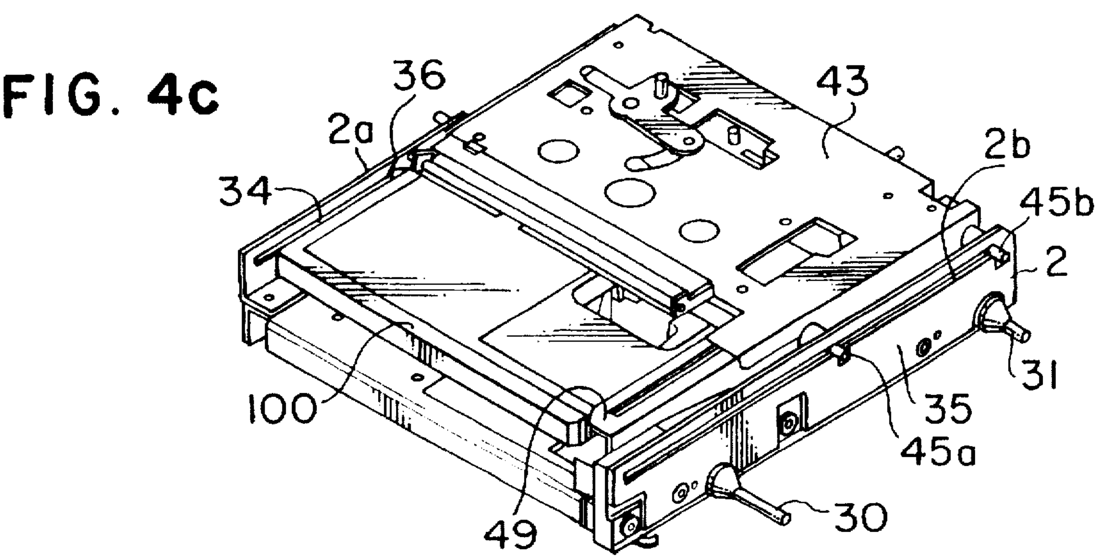
Figure 5:
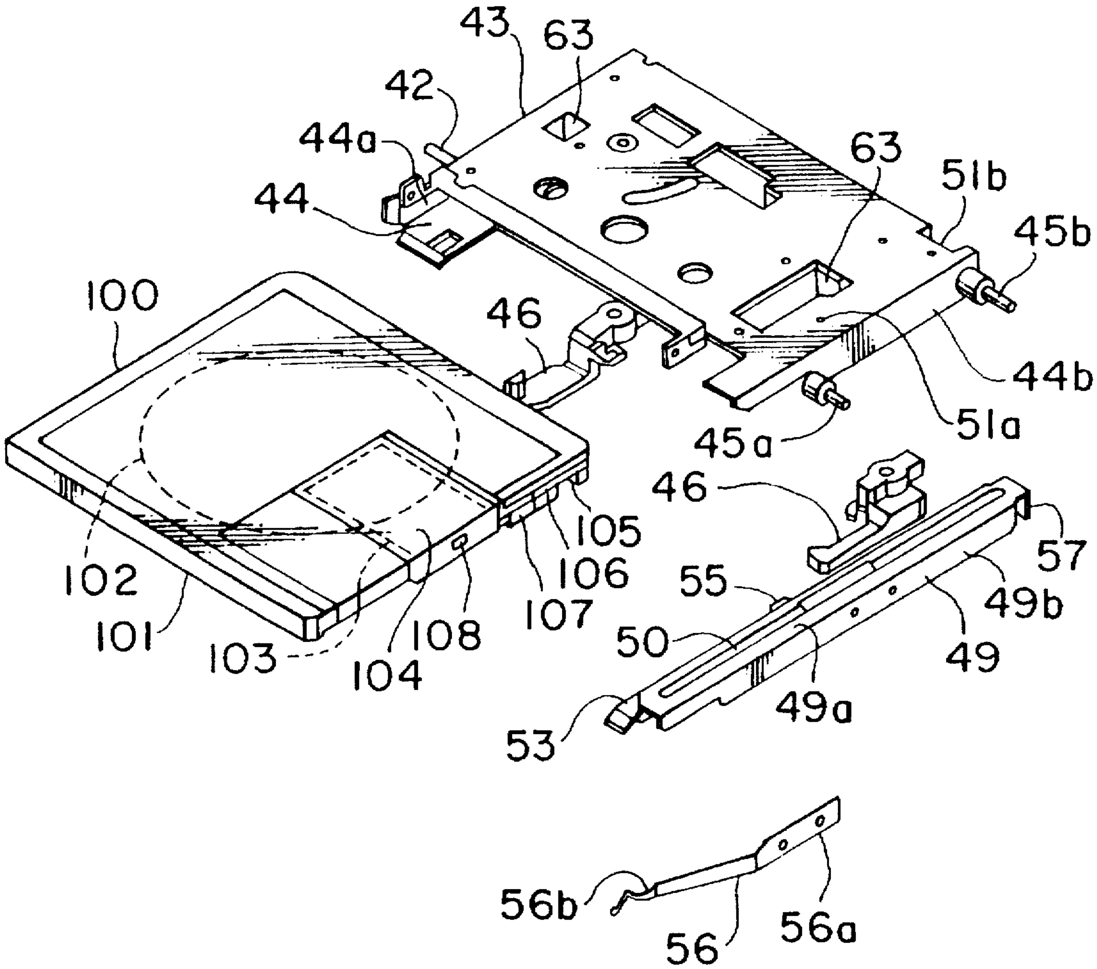
Figure 6A:
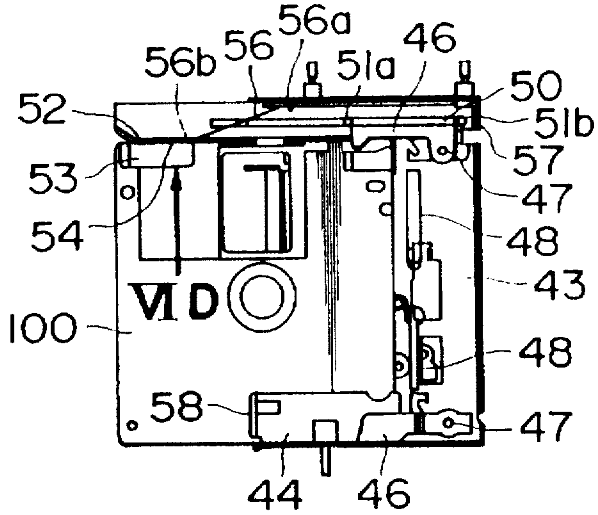
Figure 6B:
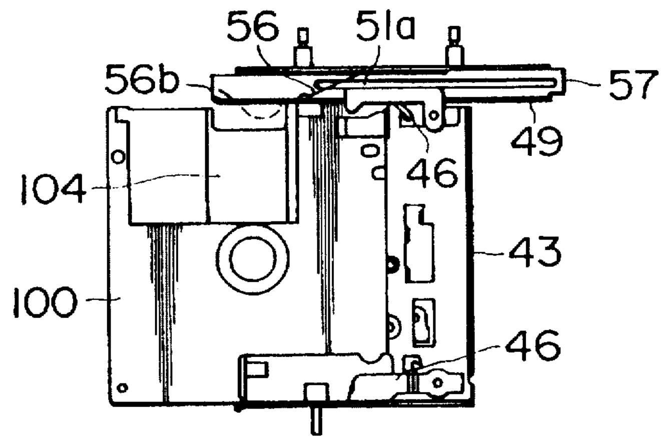
Figure 6C:
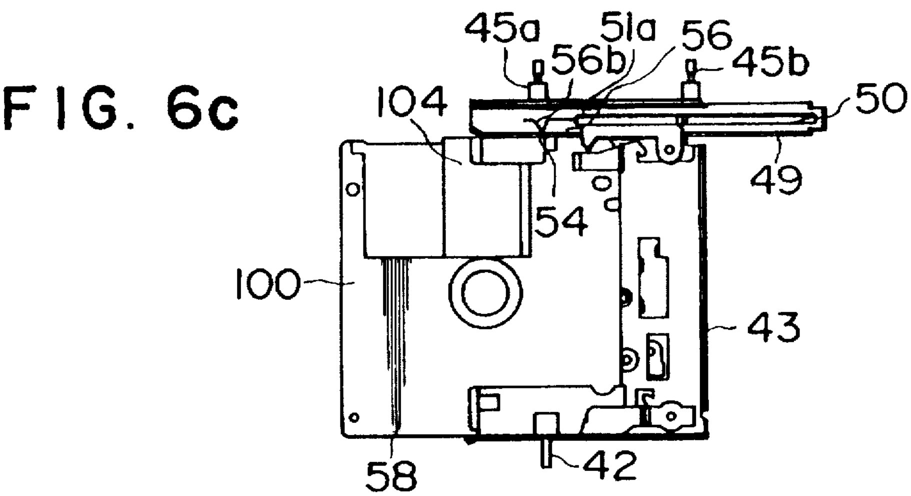
Figure 6D:
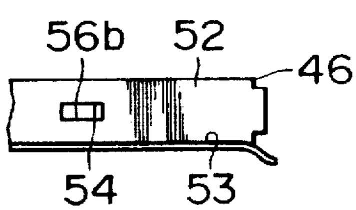

FIG. 4*a* is a perspective view illustrating the disc apparatus in a cartridge ejecting condition;

FIG. 4*b* is a perspective view illustrating the disc apparatus in a cartridge loading condition;

FIG. 4*c* is a perspective view illustrating the disc apparatus just before the completion of cartridge loading;

FIG. 5 is an exploded perspective view illustrating a holder in the disc apparatus:

FIG. 6*a* is a plan view illustrating the holder in a condition in which a shutter of a disc cartridge is opening;

FIG. 6*b* is a plan view illustrating the holder in a condition in which the shutter of a disc cartridge is half opened;

FIG. 6*c* is a plane view illustrating the holder in a condition in which the slide shutter of the disc cartridge is closed;

FIG. 6*d* is a view illustrating the holder as viewed in the direction X in FIG. 6*a;*

Figure 7A:
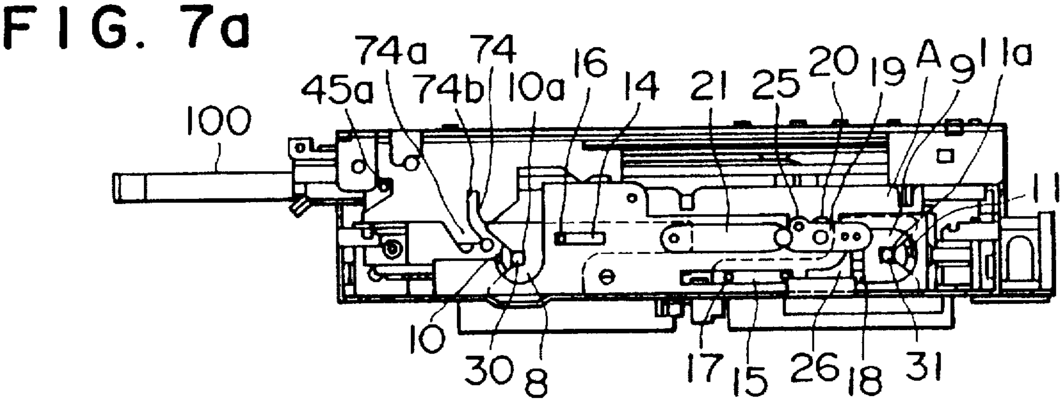
Figure 7B:
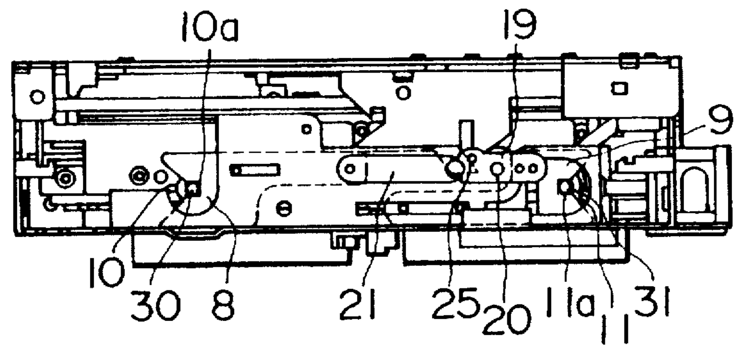
Figure 7C:
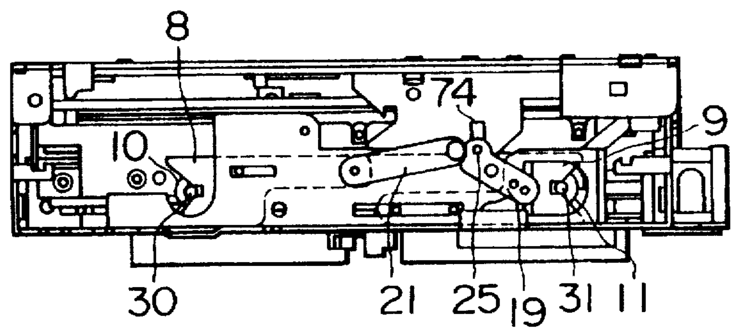
Figure 7D:
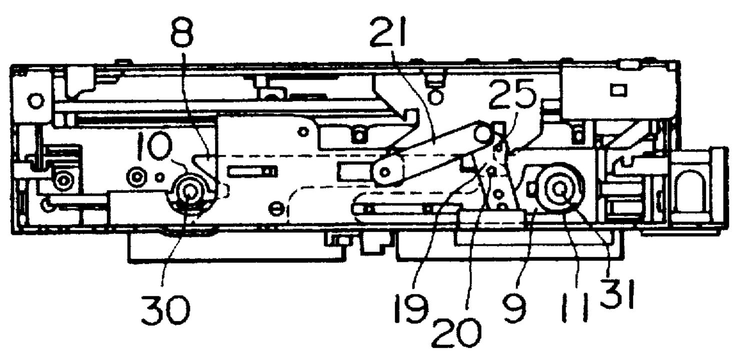
Figure 9A:
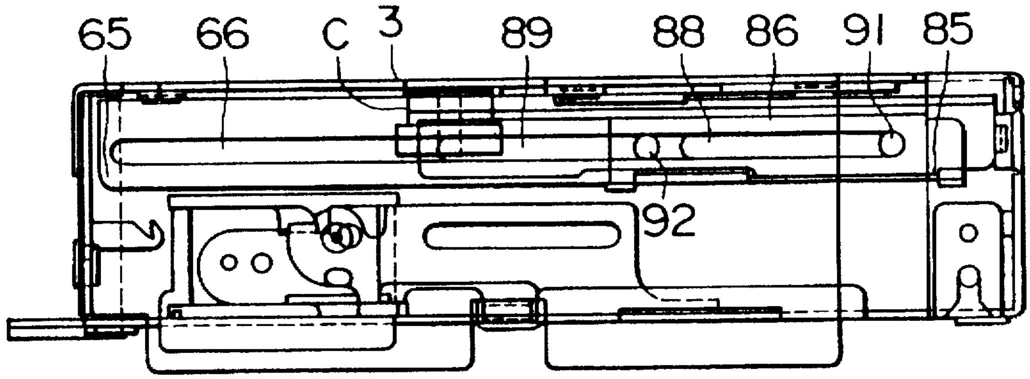
Figure 9B:
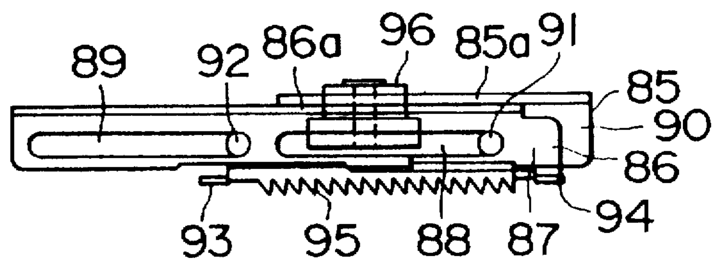
Figure 9C:
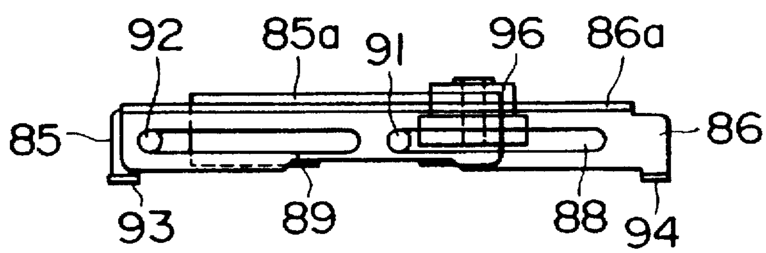
Figure 10A:
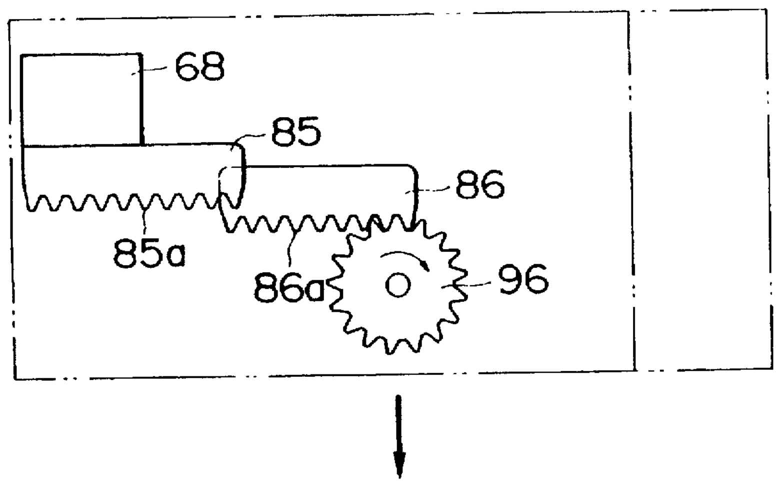
Figure 10B:
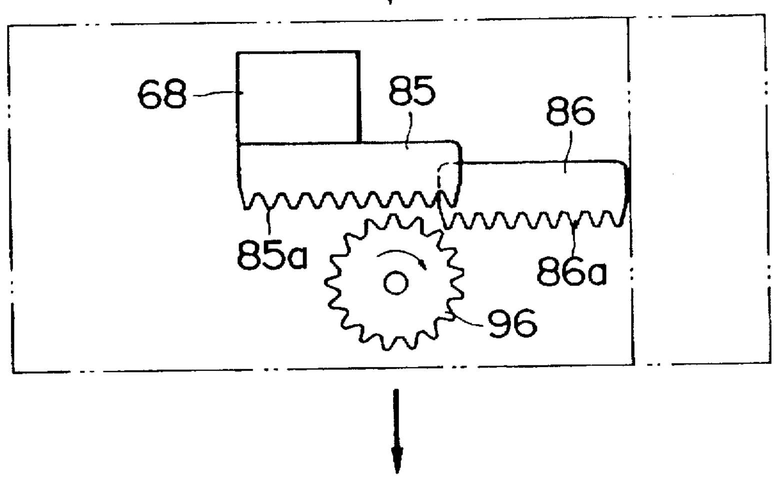
Figure 10C:
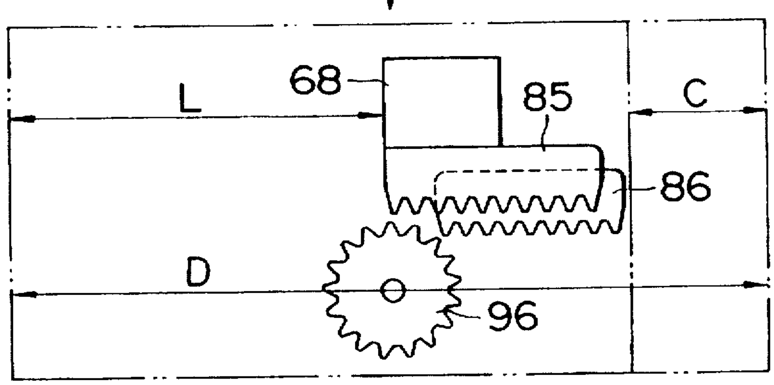
Figure 11:
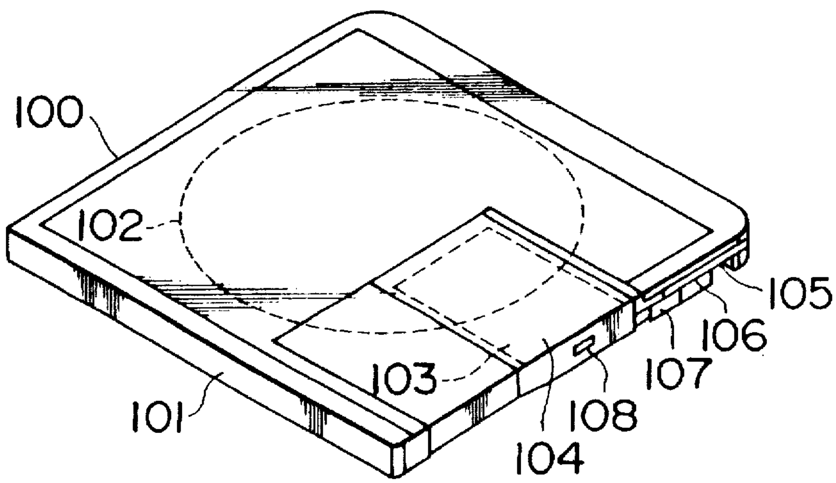
Figure 12:
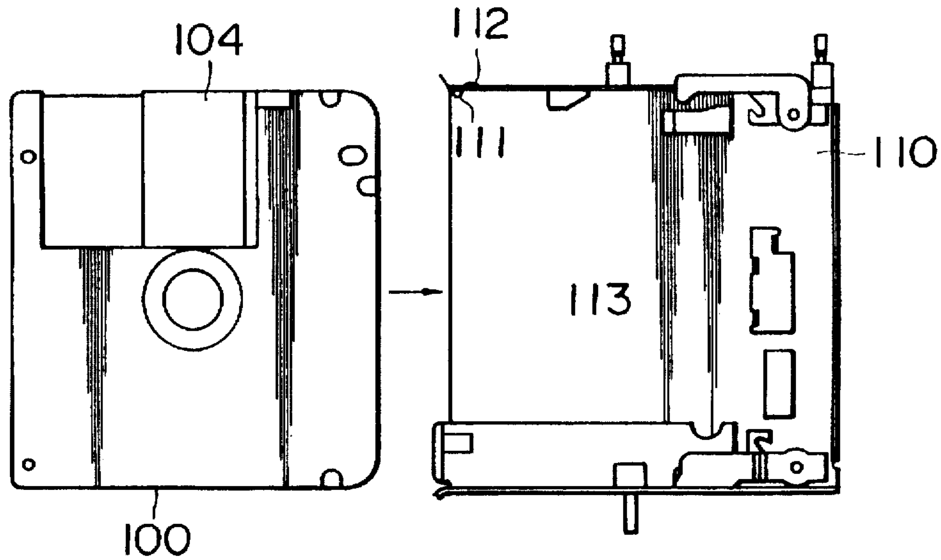
Figure 13A:
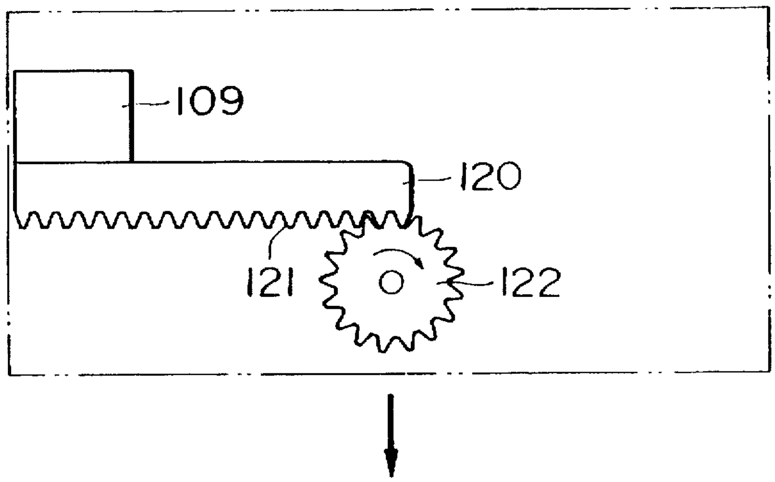
Figure 13B:
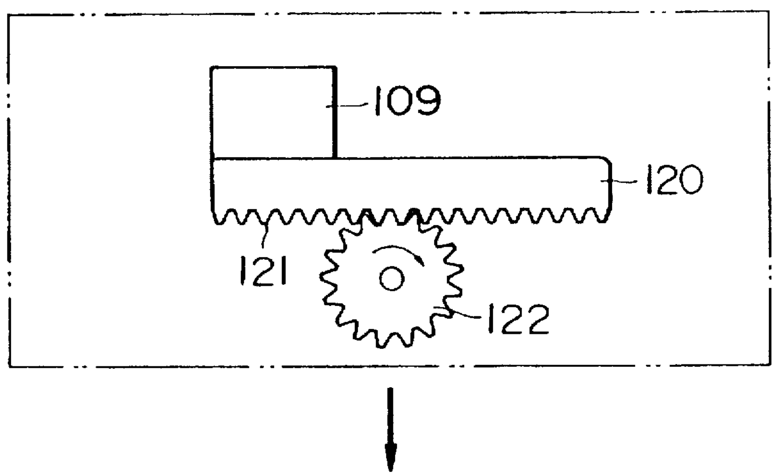
Figure 13C:
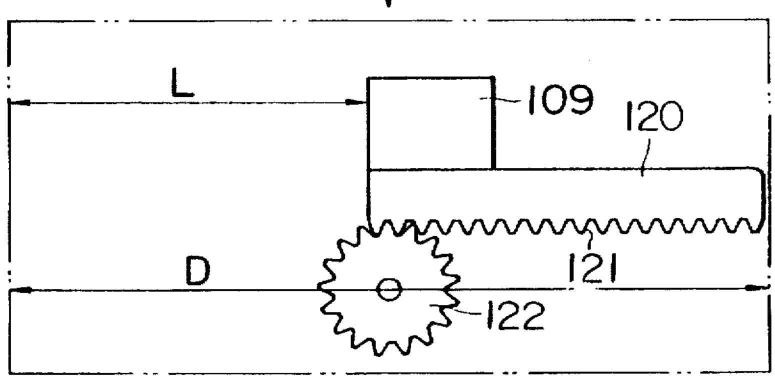

FIG. 7*a* is a right side view illustrating an essential part of a disc apparatus according to the present invention;

FIGS. 7*b* to 7*d* are side views showing steps of releasing a mechanical lock mechanism from a lock condition;

FIGS. 8*a* to 8*e* are views for explaining the steps of releasing the mechanical lock mechanism from the lock condition;

FIG. 9a is a side view illustrating an essential part of a loader shifting mechanism of the disc apparatus;

FIGS. 9b and 9c are views for explaining first and second rack members in the loader shifting mechanism;

FIGS. 10a to 10c are views illustrating principle operation of the first and second rack members in the loader shifting mechanism;

FIG. 11 is a perspective view illustrating a cartridge;

FIG. 12 is a plan view illustrating a holder in a conventional disc cartridge; and FIGS. 13a to 13c are views for explaining a loader shifting mechanism in a conventional disc apparatus.

DESCRIPTION OF PREFERRED EMBODIMENTS OF THE INVENTION

Figure 1:
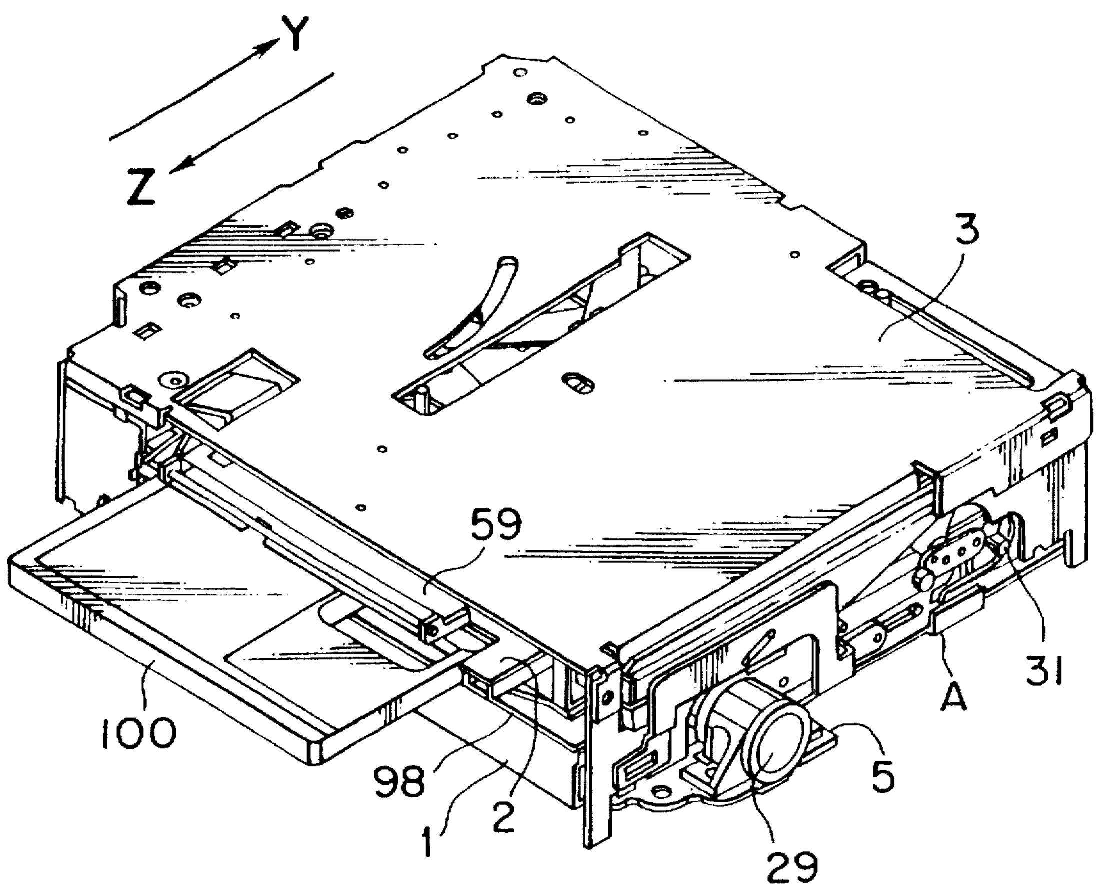
FIG. 1 is a perspective view illustrating an essential part of a disc apparatus according to the present invention.
Figure 2:
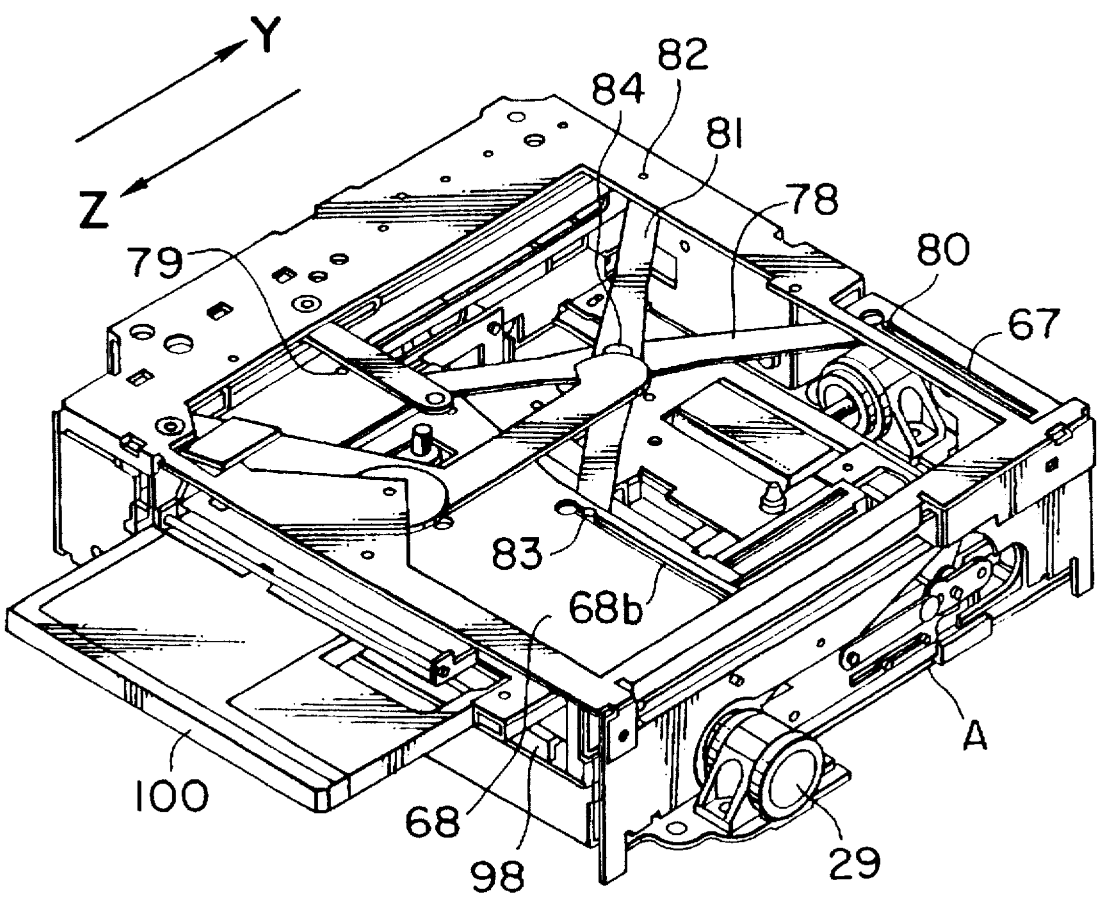
FIG. 2 is a perspective view illustrating the disc apparatus from which a part of an upper stationary chassis is eliminated.
Figure 3:
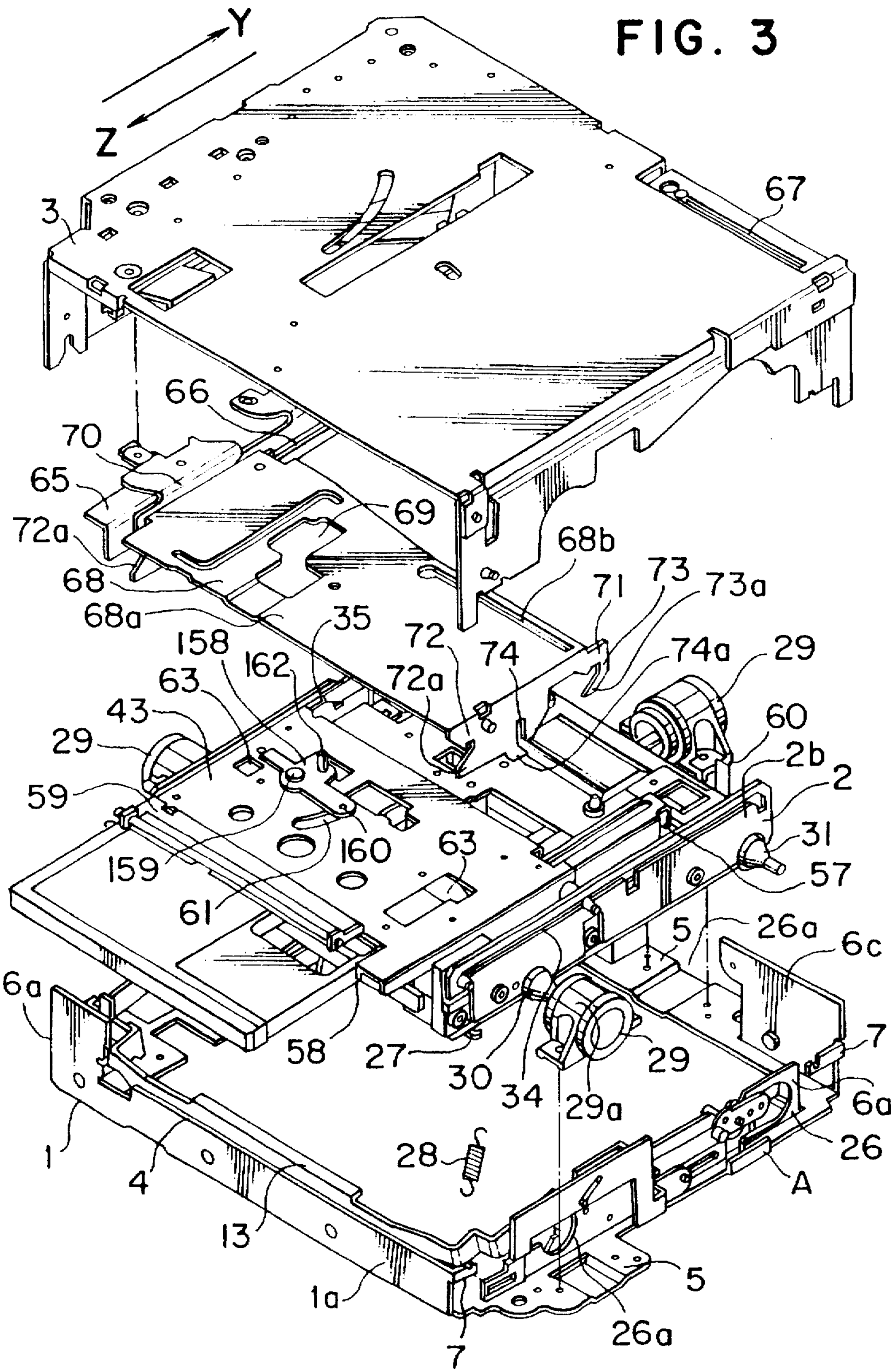
FIG. 3 is an exploded perspective view illustrating the disc apparatus.

Referring to FIGS. 1 to 3, a disc apparatus includes a main chassis 1 as a stationary chassis, a suspension chassis 2 as a movable chassis, and an upper chassis 3 as a stationary chassis. The above-mentioned chassis 1 is a rectangular frame body having a front surface pat 1a formed therein a cut-out defining a cartridge insertion opening 4. Damper attachment parts 5 are provided at left, right and rear sides of the main chassis 1, and cut-out parts 26, 26a are formed in left and right side parts 6a, 6b and a rear side part 6c of the main chassis 1 at positions opposite to the damper attaching parts 5. Further, spring retainers 7 are formed at four corner parts of the main chassis 1. Further, a double insertion preventing lever 13 is provided in the cartridge insertion opening 4, which is movable more or less in the vertical direction.

Further, a mechanical lock mechanism A is attached to each of the left and right side parts 6a, 6b of the main chassis 1. The mechanical lock mechanism A has front and rear lock members 8, 9 which are formed at their front parts with lock parts 10, 11 having guide parts 12 converging toward their center locking recesses 10a, 11a, and a vertically elongated hole 18 is formed in the rear lock member 9.

Further, the front and rear lock members 8, 9 are attached to horizontal guide holes 14, 15 formed in the right side part 6b by means of pins 16, 17 so as to be movable back and forth. A lever 19 is rotatably attached at its intermediate position to the right side part 6b of the main chassis 1 by means of a fulcrum pin 20. The front end part of the lever 19 is coupled to the rear end part of a connecting rod 21 by a pin 22. The front end part of the connecting rod 21 is coupled to the rear end part of the above-mentioned lock member 8 by a pin 23. Further, a guide pin 24 is attached to the rear end part of the lever 19, and is inserted in the elongated hole 18 and the cut-out part 26 so as to be movable therein. Further, an actuating pin 25 is attached to the front end part of the lever 19, projecting inward of the main chassis 1.

The above-mentioned suspension chassis 2 incorporates at its four corner parts spring retainers 27, and springs 28 are provided bridging between the these spring retainers 27 and spring retainers 7 of the main chassis 1 so that the suspension chassis 2 is supported to the main chassis 1 in a floating condition. Further, dampers 28 are interposed between the suspension chassis 2 and the main chassis 1. Damper bodies 29a of these dampers 29 are fixed to the damper attaching parts 5 on the main chassis 1. Further, lock pins 30, 31 are fixed at the front and rear parts of the left and right surface parts 2a, 2b of the suspension chassis 2, the front lock pin 30 being located in the cut-out parts 26a and in front of the lock part 10 of the lock member 8 and the rear lock pin 31 being located in the cut-out part 26 and in rear of the lock part 11 of the lock member 9. It is noted that this condition is a lock released condition.

A turntable (which is not shown) is located in the center part of the suspension chassis 2. Further, an optical pick-up (which is not shown) is located in a stamped part (which is not shown) which is formed in the suspension chassis 2 at a position right side of the turntable. The optical pick-up is moved right and left (radially of a disc) by means of a screw feed mechanism. A mechanism including a drive motor for the turntable is provided on the rear side of the suspension chassis 2.

Holder guide parts 34, 35 are formed in the left and right surface parts 2a, 2b of the suspension chassis, as shown in FIG. 4a. The left holder guide part 34 is composed of a linear guide hole 36 formed extending between the front and rear parts of the left surface part 2a, and a descending hole 37 directed downward from the rear end part of the guide hole 36. Further, the right holder guide part 35 is composed of a linear guide hole 38 extending between the front and rear parts of the right surface part 2b, a descending guide hole 39 directed downward from an intermediate part of the guide hole 38, a descending guide hole 40 directed downward from the rear end part of the guide hole 38, and a slide guide member 41 laid along the right surface part 2b and having a resiliency. Further, a stopper 60 which prevents the shutter opener 49 from moving rearward, is located at the right side of the rear part of the suspension chassis 2.

A holder 43 is provided in the suspension chassis 2, being held by the holder guide parts in the left and right surface parts 2a, 2b so as to be movable back and forth. That is, an inverted U-like cross-sectional shape holding part 44 is formed in the left side part of the holder 43, as shown in FIG. 5, and the end face of the holding part 44 is defined by the left surface part 44a of the holder 43, and the right surface part 44b of the holder is bent at a right angle so as to form a right surface part 44b. Further, a holder pin 42 is attached to the front part of the left surface part 44a of the holder 43, and two holder pins 45a, 45b are attached to the right surface part 44b thereof. Further, cartridge gripping hooks 46 are attached to the left and right parts of the rear surface of the holder 43 by means of pins 47 so as to be swingable left and right, at positions in the front part, and are urged toward the center of the holder 43 by means of springs 48. Left and right cartridge receiving parts 63 are formed in the surface part of the holder 43.

A shutter opener 49 is attached to the left side part of the holder 43 thus arranged, so as to be movable back and forth. That is, the shutter opener 49 has an upper surface part 49a adapted to slide at the left side part of the holder 43, and an outside surface part 49b, and a longitudinal slide hole 50 is formed in the upper surface part 49a. Holding pins 51a, 51b which also serves as pins for releasing the shutter closing springs, are inserted in the slide hole 50, and hold the shutter opener 49.

An inside surface part 52 and a horizontal surface part 53 are formed, as shown in FIGS. 6a and 6b, in the front part of the shutter opener 49, and an opening 54 is formed in the inside surface part 52. The front end parts of the inside surface part 52 and the horizontal surface part 53 are opened to the outside, the inside surface part 52 and the horizontal surface part 53 of the shutter opener 49, and the left holding part 44 of the holder 43 defining an cartridge insertion part 58 in which an opening and closing door 59 is operably provided.

Further, a shutter locking and releasing pawl 55 is provided in the intermediate part of the shutter opener 49.

Further, the base part 56a of the shutter closing spring 56 is fixed to the inside of the outside surface part 49b of the shutter opener 49, and the shutter closing spring 56 is bent inward, having its front end part is formed with an engaging part 56b which is curved in a V-like shape as seen in a plan view. The engaging part 56b is projected into the cartridge insertion part 58 through the opening 54. Further, a stopper 57 is formed in the rear end part of the shutter opener 49, and the front holding pin 51a constitutes an escape mechanism for retracting the engaging part 56b of the shutter closing spring 56 from the cartridge insertion part 58 through the opening 54.

Further, the holder 43 attached thereto with the shutter opener 49 as mentioned above, is supported to the suspension chassis 2, the left guide pin 42 being inserted movably in the guide hole 36 of the holder guide part 34 in the left surface part 2a of the suspension chassis 2, and the right front guide pin 45a being inserted movably in the guide hole 38 of the holder guide part 35 in the right surface part 2b of the suspension chassis 2 while being made into slide contact with the lower surface of the slide guide member 40, and the right rear guide pin 45b being inserted movably in the guide hole 38 of the holder guide part 35 in the right surface part 2b of the suspension chassis 2 while being made into slide contact with the upper surface of the slide guide member 40.

A loader guide 65 is longitudinally secured to the left side of the rear surface of the upper surface part of the upper chassis 3, as shown in FIG. 3 and FIG. 9a, and a longitudinal guide hole 66 is formed in the loader guide 65. A crosswise guide hole 67 is formed in the rear part of the upper surface of the upper chassis 3.

A loader 68 and a loader shifting mechanism C for reciprocating the loader 68 are provided on the rear surface of the upper chassis 3. The loader 68 incorporates, at the left and right sides of its surface part 68a, left and right surface parts 70, 71 which are bent at right angles to the surface part 68a, the right surface part 70 being formed at its front and rear ends with holder pin engaging parts 72, 73, and at its intermediate position with a lock pin engaging part 74 as a pin actuating means. Further, the holder engaging parts 72, 73 have engaging pieces 72a, 73a which are projected forward. The left surface part 70 is formed at its front end with a holder pin engaging part similar to the holder pin engaging part 72, and is formed at its intermediate position with a lock pin engaging part similar to the lock pin engaging part 74.

The lock pin engaging part 74 has an engaging piece 74a which is projected rearward from the lower edge of the right surface part 71 and obliquely downward, and a pin insertion recess 74b which is extended upward from the lower edge of the right surface part 71.

A crosswise guide hole 68b is formed on the right side of the rear part of the upper surface part 68a of the loader 68. Further, the front end part of a link 78 is attached to the left rear end part of the upper surface part 68a of the loader 68 by a pin 79, as shown in FIG. 2. A guide pin 80 provided in the rear end part of the link 78, is inserted in the guide hole 67 in the rear part of the upper chassis 3. Further, a link 81 is attached at its rear end to the right rear end part of the upper chassis 3, and is provided at its front end with a guide pin 83 which is inserted in the guide hole 68b in the rear part of the loader 68. The links 78, 81 are rotatably coupled together at their center crossing parts by means of a pin 84.

The above-mentioned loader shift mechanism C incorporates a first rack member 85 and a second rack member 86 which are laid along the loader guide 65, the second rack member 86 being slidably superposed with the rear end pat of the first rack member 85, and front and rear guide holes 88, 89 are formed in a rise wall part 87 of the second rack member 86, as shown in FIGS. 9a to 10. Further, guide pins 91, 92 are fixed to the front and rear end parts of a rise wall part 90 of the first rack member 85, the front guide pin 91 piercing through the guide hole 88, and the rear guide pin 92 piercing through the guide hole 89. The end parts of the guide pins 91, 92 are coupled to the right surface part 71 of the loader 68.

Further, a spring retainer 93 is formed in the rear end part of the first rack member 85, and a spring retainer 94 is formed in the front end part of the second rack member 86, and a spring 95 is provided bridging between both spring retainers 93, 94.

Further, a gear 96 is meshed with a tooth part 86a of the second rack member 86, and is engaged with a drive motor (which is not shown) through the intermediary of a pinion gear train (which is not shown).

The thus constructed upper chassis 3 is superposed with the main chassis 1 and is secured to the latter. In this case, the front and rear holder pin engaging parts 72, 73 provided on the right side of the loader 68 are slidably engaged with the holder pins 45a, 45b, and the holder pin engaging part 72 provided on the left side of the loader 68 is slidably engaged with the holder pin 42. Further, the front edge of the upper chassis 3 and the cartridge insertion part 4 of the main chassis 1 defines an cartridge insertion opening 98.

Before insertion of the above-mentioned cartridge (which is the same as that mentioned in the explanation to the prior art) 100, the suspension chassis 2 is locked to the main chassis 1 by means of the left and right mechanical lock mechanisms A. That is, after the front lock member 8 in the mechanical lock mechanism A is moved forward, the lock part 10 at the front end of the lock member 9 grips the front lock pin 30 on the suspension chassis 2, and the lock part 11 at the front end of the lock member grips the rear lock pin 31 on the suspension chassis 2.

Next, explanation will be made of the operation of the disc apparatus constructed as mentioned above.

As shown in FIG. 6c, when the holder 43 is positioned on the cartridge insertion opening 98 side, the holding pin 51a also serving as the shutter closing spring releasing pin on the holder 43 is positioned in the front side so as to interfere with the intermediate part of the shutter closing spring 56, and accordingly, the engaging part at the front end of the shutter closing spring 56 is retracted from the opening part 54. Accordingly, when the cartridge 100 is inserted into the cartridge insertion part 58 in the holder 43 through the cartridge insertion opening 98, the engaging part 56b of the shutter closing spring 56 does not interfere with the cartridge 100, and accordingly, the feeling of insertion of the cartridge 100 becomes satisfactory, and further, the cartridge 100 is prevented from being scratched due to contact between itself and the engaging part 56b of the shutter closing spring 56.

Further, after the cartridge 100 is inserted into the cartridge insertion part 58 of the holder 43 through the cartridge insertion opening 98, when the front end face of the cartridge 100 abuts against the cartridge receiving part 63 of the holder 43, the shutter locking and engaging pawl 55 of the shutter opener 49 is inserted into the groove 106 of the cartridge 100, and further, the left and right cartridge gripping hooks 46 of the holder 43 are engaged with the left and right cartridge gripping recesses 105 of the cartridge casing 101 so that the cartridge 100 is held in the holder 43 through the intermediary of the cartridge gripping hooks 46.

Further, when the above-mentioned cartridge 100 is pushed in, a control circuit (which is not shown) for the drive motor in the loader shifting mechanism C is energized (turned on) so that the loader 68 is operated by the loader shifting mechanism C. Accordingly, the slide shutter of the cartridge 100 is opened, and the suspension chassis 2 is released from its locked condition while the cartridge 100 is automatically introduced.

(Loader Operation)

When the pinion is rotated by the drive motor, the gear 96 is rotated through the intermediary of the gear train, and accordingly, the second rack member 86 meshed with the gear 96 through the intermediary of the tooth part 86*a* is moved rearward. Thus, the guide pins 91, 92 are pushed by the front end parts of the guide holes 88, 89 formed in the second rack member 86, and accordingly, the loader 68 is moved rearward. In this case, in association with the movement of the loader 68, the rack member 85 is moved rearward. When the gear 96 comes to the front end of the tooth part 86*a* of the second rack member 86, the gear is meshed with the rear end part of the tooth part 85*a* of the first rack member 85. Further, when the gear 96 leaves off from the tooth part 86*a* of the second rack member 86, it meshes with only the tooth part 85*a* of the first rack member 85 which is therefore moved rearward. This movement causes the loader 68 to move rearward by means of the guide pins 91, 92. Further, the rearward movement of the first rack member 85 causes the second rack member 86 to move rearward through the intermediary of the spring 95.

(Release Operation of Slide Shutter 104 in Cartridge 100)

Since the front and rear holder engaging parts 72, 73 which are provided on the right side of the loader 68 are slidably engaged with the holder pins 45*a*, 45*b*, and further, since the holder pin engaging part 72 which is provided on the left side of the loader 68 is slidably engaged with the holder pin 42, the rearward movement of the loader 68 causes the holder 43 to move rearward, that is, the cartridge 100 is moved rearward.

Accordingly, the holder 43 is retracted so that the holding pin 51*a* comes off from the intermediate part of the shutter closing spring 56. Thus, the engaging part 56*b* at the front end of the shutter closing spring 56 is projected into the cartridge insertion part 58 through the opening 54. In this case, the stopper 57 at the rear end part of the shutter opener 49 makes contact with the stopper 60 provided on the suspension chassis 2, and accordingly, the shutter opener 49 is prevented from being rearward moved.

The shutter locking and releasing pawl 55 of the shutter opener 49 pushes the shutter engaging member in the cartridge 100 so as to retract the same, and accordingly, the engagement of the slide shutter 104 with the shutter engaging member of the engaging pawl 107 is released. At this time, the engaging part 56*b* at the front end of the shutter closing spring 56 is engaged in the shutter opening and closing hole 108 in the slide shutter 104. Thus, the slide shutter 104 is opened as the cartridge 100 is moved rearward (Refer to FIGS. 6*b* to 6*c*).

(Locking Operation of Suspension Chassis 2)

Figure 8A:
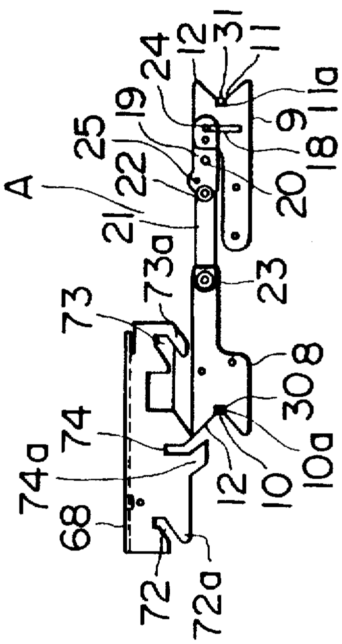
Figure 8B:
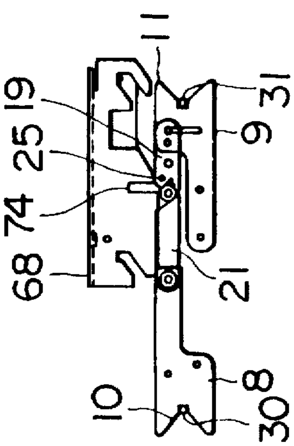
Figure 8C:
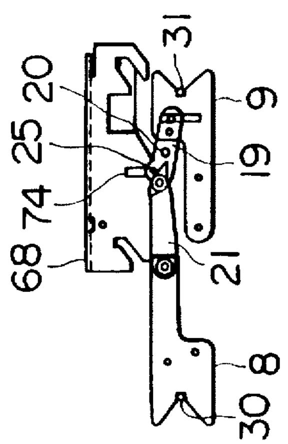
Figure 8D:
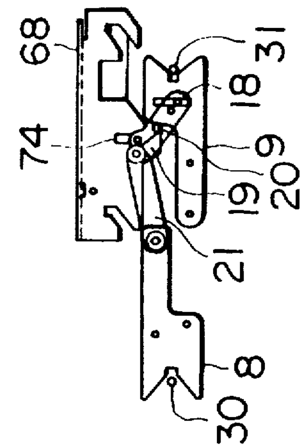
Figure 8E:
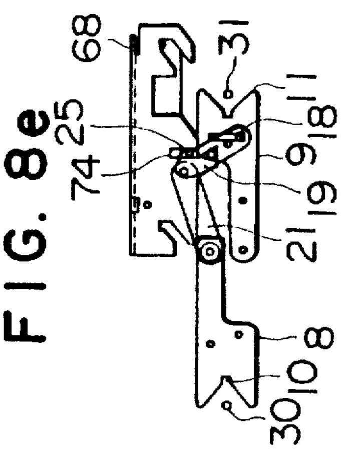

When the holder 43 is moved rearward as the loader 68 is moved rearward, the locking engaging piece 74*a* of the lock pin engaging part 74 on the loader 68 is engaged with the actuating pin 25 of the lever 19 in the mechanical lock mechanism A as shown in FIGS. 7*a* and 7*b*, and FIGS. 8*a*, and 8*b*. Accordingly, the actuating pin 25 is guided upward so that the lever 19 is rotated clockwise as shown in FIGS. 7*c* and 8*d*, and the front and rear lock members 8, 9 are therefore pulled inward. Thus, as shown in FIG. 8*e*, the front lock pin 30 on the suspension chassis 2 is released from the front lock part 10 of the lock member 8, and the rear lock pin 31 on the suspension chassis 2 is released from the lock part 10 at the front end of the lock member 8, and accordingly, the suspension chassis 2 is released from its locked condition. As a result, the suspension chassis 2 is supported by the springs at the four corner parts thereof.

(Automatic Introduction of Cartridge 100)

When the holder 43 is further moved rearward, the above-mentioned holder pins 42, 45*a*, 45*a* are led into the descending holes 37, 39, 40 in the left and right holder guide parts 34, 35 in the suspension chassis 2, being guided by the left and right holder guide pats 34, 35, and the hub of the turntable is engaged into a center (which is not shown) which is visible through a center hole formed in the lower surface of the cartridge 100. At this time, the holder pins 42, 45*a*, 45*b* come off from the holder pin engaging parts 72, 73, but the engaging pieces 72*a*, 73 do not come off from the holder pins 42, 45*a*, 45*b*.

In this condition, a control circuit (which is not shown) for the drive motor of the turntable is energized (turned on), and a control circuit (which is not shown) for the drive motor of the optical pick-up, is energized (turned on) so that the data recording disc 102 is rotated while the optical pick-up is moved left and right (radially of the disc) by means of the screw feed mechanism for reproducing or recording.

Next, after completion of the reproducing or the recording, the loader 68 is moved in the reverse direction so that the cartridge 100 is ejected, and the suspension chassis 2 is locked.

(Reverse Movement of Loader 68)

When the drive motor is reversed so as to reversely rotate the pinion, the gear 96 is reversely rotated through the intermediary of the gear train, and the first rack member 85 meshed with the gear 96, through the intermediary of the tooth part 85*a* is moved forward so that the loader 68 is moved forward by means of the guide pins 91, 92. When the gear 96 comes to the rear end of the tooth part 85*a* of the first rack member 85, the gear 96 is meshed with the tooth part 86*a* of the second rack member 85 which is therefore moved forward. The guide pins 91, 92 are pushed by the rear ends of the guide holes 88, 89 formed in the second rack member 86, and accordingly, the loader 68 is moved forward.

(Ejecting Operation of Cartridge 100)

When the loader 68 is moved forward, the engaging pieces 72*a*, 73*a* of the front and rear holder pin engaging parts 72, 73 provided on the loader 68 push the holder pins 45*a*, 45*b*, 42 forward so that the holder 43 is moved forward, and accordingly, the cartridge 100 is moved forward. As the holder 43 is moved forward, the holder pins 43, 45*a*, 45*b* are returned into the linear guide holes 36, 38 from the descending holes 37, 39, 40, being guided by the left and right holder guide parts 34, 35 in the suspension chassis 2, and accordingly, the center of the cartridge 100 leaves off from the turntable, and is moved forward being guided by the left and right holder guide parts 34, 35. Thus, the cartridge is ejected from the cartridge insertion part 99 of the holder 43 toward the cartridge insertion opening 98.

(Closing Operation of Slide Shutter 104 in Cartridge 100)

Upon ejection of the cartridge 100, since the engaging part 56b at the front end part of the shutter closing spring 56 is engaged with the shutter opening and closing hole 108, the slide shutter 104 is closed as the holder 43 is moved forward. Further, the shutter locking and releasing pawl 55 of the shutter opener 49 is disengaged from the shutter engaging member in the cartridge 100 and is projected, and accordingly, the locking pawl 107 of the slide shutter 104 is engaged with the shutter engaging member. Further, the engaging part 56b at the front end of the shutter closing spring 56 comes off from the shutter opening and closing hole 108.

(Lock Operation of the Suspension Chassis 2)

Upon ejection of the cartridge 100, when the loader 68 is moved forward, the pin insertion recess 47b of the lock pin engaging part 74 on the loader 68 pushes, at its side surface, the actuating pin 25 on the lever 19 forward so as to depress the actuating pin 25, and accordingly, the lever 19 is rotated counterclockwise with the sequence in the order as shown in FIGS. 8e, 8d, 8c, 8b and 8a, so as to force the front and rear lock members 8, 9 into opening outward. Accordingly, the lock part 10 at the front end of the front lock member 8 fixes the front lock pin 30 on the suspension chassis 2, and the lock part 11 at the front end of the rear lock member 9 fixes the rear lock pin 31 on the suspension chassis 2.

In the above-mentioned embodiment, the loader 68 is moved in the conveying direction so as to move the cartridge 100 through the intermediary of the holder 43, and when the cartridge 100 comes to the reproducing/recording position, the lock pin engaging part 74 incorporated to the loader 68 interferes with the mechanical lock mechanism A which therefore releases the holder pins 30, 31 from the locked condition. Further, when the cartridge 100 is moved in the ejecting direction through the intermediary of the holder 43 during movement of the loader 68, the lock pin engaging part 74 interferes with the mechanical lock mechanism A which therefore locks the holder pins 30, 31.

Thus, since the mechanical lock mechanism A is moved being directly coupled to the loading mechanism, the timing of operation of the mechanical lock mechanism is prevented from being out of phase so that the suspension chassis can precisely be positioned.

As mentioned above, according to the present invention, the holder pin is provided on the movable chassis which is supported to the stationary chassis through the intermediary of the resilient members and on which the turntable and the pick-up head are mounted, the mechanical lock mechanism adapted to releasably grip the holder pin so as to fix the movable chassis to the stationary chassis is provided on the stationary chassis, the holder for holding the cartridge so as to load and eject the cartridge thereon is movable provided on the movable chassis, the loader for conveying the holder in a predetermined direction is provided on the stationary chassis, and the pin actuating means which interferes with the mechanical lock mechanism at an end of the loading operation of the cartridge so as to cause the mechanical lock mechanism to release the holder pin from its locked condition, and which interferes with the mechanical lock mechanism at a start of the ejecting operation of the cartridge so as to cause the mechanical lock mechanism to lock the holder pin is provided on the loader. With this arrangement, at an end of loading operation of the cartridge, the pin actuating means incorporated on the loader interferes with the mechanical lock mechanism so that the mechanical lock mechanism can release the holder pin from its locked condition, and further, at a start of ejecting operation of the cartridge, the pin actuating means interferes with the mechanical lock mechanism so that the mechanical lock mechanism can lock the holder pin. Since the mechanism lock mechanism is moved being directly locked to the loading mechanism, the movable chassis can be precisely positioned without the timing of operation of the mechanical lock mechanism becoming out of phase.

Further, in the above-mentioned embodiment, since the shutter opener 49 on the holder 43 is held by the holding pin 51a which interferes with the shutter closing spring 56 so as to retract the engaging part 56b from the cartridge insertion part 58 through the opening 54 when the holder is positioned forward, the holder pin 51a on the holder 43 is positioned forward so as to interfere with the shutter closing spring 56, and accordingly, the engaging part 56b of the shutter closing spring 56 can be retracted from the cartridge insertion part through the opening 54 when the holder 43 is positioned forward. Further, the holder pin 51a comes off the shutter closing spring 56 when the holder is moved rearward, and accordingly, the engaging part 56b of the shutter closing spring 56 is projected into the cartridge insertion part 58 through the opening 54.

Thus, when the above-mentioned holder is positioned forward, the engaging part 56b at the front end of the shutter closing spring 56 is retracted from the cartridge insertion part 58 from the opening, and accordingly, the cartridge 100 inserted into the cartridge insertion part 58 is prevented from abutting against the engaging part 56b of the shutter closing spring 56 so that the feeling of insertion becomes satisfactory, and the cartridge 100 is prevented from being scratched due to contact between itself and the engaging part 56b.

As mentioned above, according to the present invention, the shutter opener is provided at one side of the holder for conveying the cartridge incorporating the data recording disc and the slide shutter in a predetermined conveying direction, so as to be reciprocatable in the conveying direction, relative to the holder, the holder and the shutter opener defining the cartridge insertion part, the shutter closing spring having at its one end the engaging part is secured to the shutter opener, the opening through which the engaging part of the shutter closing spring is projected into the cartridge insertion part is formed in the cartridge insertion part side surface of the shutter opener, and the escape mechanism which retracts the engaging part of the shutter closing spring from the cartridge insertion part through the opening when the holder is located on the cartridge introducing position is provided in the holder. With this arrangement, when the holder is located on the cartridge introducing side, the escape mechanism can retract the engaging part of the shutter closing spring from the cartridge insertion part through the opening. Further, when the holder is moved in the conveying direction, the escape mechanism becomes inoperative so that the engaging part of the shutter closing spring is projected into the cartridge insertion part through the opening.

Thus, when the holder is positioned on the cartridge introduction side, the engaging part at the front end of the shutter closing spring is retracted from the cartridge insertion part through the opening, and accordingly, the cartridge inserted in the cartridge insertion part is prevented from abutting against the engaging part of the shutter closing spring so that the feeling of insertion becomes satisfactory, and the cartridge is prevented from being scratched due to contact between itself and the engaging part.

Further, according to the above-mentioned embodiment, when the gear 96 is rotated through the intermediary of the gear train, the second rack member 86 meshed with the gear 96 through the intermediary of the tooth part 86*a* is moved rearward, and the guide pins 91, 92 are pushed by the ends of the guide holes 88, 89 formed in the second rack member 86 so that the loader 68 is moved rearward. In this case, the first rack member 85 is moved rearward in association with the movement of the loader 68 (Refer to FIGS. 10*a* and 10*b*).

When the gear 96 comes to one end part of the tooth part 86*a* of the second rack member 86, the gear 96 is meshed with the tooth part 85*a* of the first rack member 85. Further, when the gear 96 leaves off from the tooth part 86*a* of the second rack member 86, it is only meshed with the tooth part 85*a* of the first rack member 85 which is therefore moved rearward. This movement causes the guide pins 91, 92 to move the loader 68 rearward (Refer to FIGS. 10*b* and 10*c*).

Thus, the gear 96 on rotation feeds the second rack member 86 which therefore moves the loader 68, and thereafter, the gear 96 does not feed the second rack member 86 but do the first rack member 85 so as to move the loader 86. With this arrangement, the required space for moving the loader 68 by the distance L can be made to be small by the length C of the second rack member 86, in comparison with the conventional apparatus in which the loader is fed by a single integral rack member by a length D (Refer to FIG. 10*c*).

Further, since the first and second rack members 85, 86 are coupled together by the spring 95, when an external force is exerted to the first rack member 85 or the loader 68 in a condition in which the gear 96 is meshed with the second rack member 86, the first rack member 85 is moved, causing only the spring 96 from being extended. That is, the external force is not transmitted to the drive gear train through the gear 96, thereby it is possible to prevent the gear 96 or the like from being damaged.

As mentioned above, according to the present invention, the first and second rack members are provided on the stationary chassis so as to be movable in the direction of movement of the loader, and the guide pins are provided to the first rack member while the guide holes are formed in the second rack member, the guide pins piercing through the guide holes and being coupled at their ends with the loader, spring retainers are provided on both rack members, the spring is provided bridging between both spring retainers, and the gear is meshed with the tooth part of the second rack member and is coupled to the drive gear train. With this arrangement, when the gear is rotated through the intermediary of the drive gear train, the second rack member meshed with the gear through the intermediary of its tooth part is moved in one of the directions of movement of the loader, and the guide pins are pushed by the ends of the guide holes formed in the second rack member so as to move the loader in the one of the directions of movement of the loader. In this case, the first rack member is moved in the one of the directions of movement of the loader.

When the gear comes to one end of the tooth part of the second rack member, the gear is meshed with the tooth part of the first rack member. Further, when the gear leaves off from the tooth part of the second rack member, the gear is meshed with only the tooth part of the first rack member so sa to move the first rack member in the one of the directions of movement of the loader. This movement causes the guide pins to move the loader in the one of the directions of movement of the loader.

Thus, when the gear is rotated, the second rack member is fed to move the loader, and thereafter, the second rack member is not fed but the first rack member is fed so that the loader is moved. Accordingly, the require space can be made to be small in comparison with the conventional apparatus in which the loader is fed by a single integral rack member.

Further, since first and second racks are coupled together by means of the spring, if an external force is exerted to the first rack member or the loader in a condition in which the gear is meshed with the second rack member, the first rack member is moved, only causing the spring to be extended. Accordingly, the external force is not transmitted to the drive gear train through the gear, thereby it is possible to prevent the gears or the like from being damaged.

What is claimed is:

1. A disc apparatus comprising a holder for conveying a disc cartridge incorporating a data recording disc and a slide shutter, in a predetermined conveying direction to move said disc cartridge in a loading direction and in an ejecting direction; a shutter opener provided at one side of said holder so as to be reciprocatable in the conveying direction, relative to said holder, said holder and said shutter opener defining a cartridge insertion part, a shutter closing spring having at its one end an engaging part and fixed to said shutter opener, an opening formed in a cartridge insertion part side surface of said shutter opener, for allowing said engaging part of said shutter closing spring to project into said cartridge insertion part, and an escape mechanism provided on said holder, for retracting said engaging part of said shutter closing spring from said cartridge insertion part through said opening when said holder is positioned on a cartridge introducing side, said escape mechanism comprising a holder pin holding said shutter opener, said holder pin for making contact with said shutter closing spring so as to retract said engaging part of said shutter closing spring from said cartridge insertion part through said opening when said holder is positioned on the cartridge introducing side.

* * * * *